United States Patent
Kownacki et al.

(10) Patent No.: US 6,749,797 B2
(45) Date of Patent: Jun. 15, 2004

(54) ONE-PIECE INJECTION MOLDED WINDOW FRAME AND SASH

(75) Inventors: Charles D. Kownacki, Erie, PA (US); Stephen T. Mansfield, Monroeville, PA (US); Craig J Lawson, Slippery Rock, PA (US); Charline W. Crooks, Vienna, WV (US)

(73) Assignee: SBR Inc., Parkersburg, WV (US)

(*) Notice: Subject to any disclaimer, the term of this patent is extended or adjusted under 35 U.S.C. 154(b) by 95 days.

(21) Appl. No.: 10/068,180

(22) Filed: Feb. 6, 2002

(65) Prior Publication Data

US 2003/0145532 A1 Aug. 7, 2003

(51) Int. Cl.$^7$ .............................. E06B 3/00; B29C 45/00
(52) U.S. Cl. ...................... 264/572; 264/328.1; 49/506; 49/DIG. 2
(58) Field of Search ................................ 264/572, 573, 264/328.1; 49/506, DIG. 2; 52/656.5

(56) References Cited

U.S. PATENT DOCUMENTS

| | | | |
|---|---|---|---|
| 2,714,747 A | * | 8/1955 | Lindemann et al. |
| 2,714,748 A | * | 8/1955 | Stirnemann et al. |
| 4,129,635 A | * | 12/1978 | Yasuike et al. |
| 4,948,547 A | * | 8/1990 | Hendry |
| 4,968,474 A | * | 11/1990 | Ito |
| 5,069,859 A | * | 12/1991 | Loren |
| 5,098,637 A | * | 3/1992 | Hendry |
| 5,189,841 A | * | 3/1993 | Arbetter |
| 5,700,050 A | * | 12/1997 | Gonas |
| 5,759,479 A | * | 6/1998 | Gotterbauer |
| 5,839,234 A | * | 11/1998 | Mayer |
| 6,019,935 A | * | 2/2000 | Eckardt et al. |

* cited by examiner

Primary Examiner—Robert Canfield
(74) Attorney, Agent, or Firm—Richard K. Thomson (57) ABSTRACT

Window components are made by a fluid-assist injection molding process to reduce manufacturing costs and provide additional flexibility in the configuration of the window. In addition to the inventive product-by-process, two window configurations, a casement window and a picture window, are taught. The casement window has a frame with installation flanges and the window sash has integral mounting posts for handle hardware. Both the window frame and sash have encapsulated insulative air pockets. An acrylic window pane is taught that mimics a glass block window.

7 Claims, 8 Drawing Sheets

ONE-PIECE INJECTION MOLDED WINDOW FRAME AND SASH

BACKGROUND AND SUMMARY OF THE INVENTION

The present invention pertains to the field of window construction. More particularly, the present invention is a product-by-process, namely, a one-piece window component, such as a frame or sash, made by the process of injecting a second volume of molten polymer into a mold having a first volume, the second volume of thermoplastic resin being less than the first volume, the method further employing the step of injecting high pressure fluid (gas or liquid) to force the polymer into the recesses and to create an insulative core in said window component.

Within the current state of the window art, window components, such as frames and sashes, are manufactured by extruding a continuous length of material, cutting angled (mitered) corners to the desired dimensions of the window and connecting the cut pieces through welding or using fasteners. Cutting and welding require follow-up cleaning operations to produce a clean part. So many operations, each requiring handling by one or more workmen, significantly increase the cost of production. In addition, there are structural integrity issues: the strength of a frame made of multiple parts is weaker than one that of one-piece construction. Any torquing of the frame can produce loosening of the joints or fasteners. The extruding step does not permit any variation in the outline of the structural member so that any shaping, to provide clearance for hinge hardware, for example, involves an additional secondary operation adding still further cost. All attachment hardware must be mounted using fasteners which, again, adds an expensive secondary operation.

The product-by-process of the present invention remedies these short comings of the prior art. The one-piece, injection molded window component of the present invention (both the window frame and the window sash) has enhanced strength characteristics, including resistance to the effects of torque. Injection molding permits three-dimensional blending of geometries. The clearance recesses for support hinge hardware, as well as the pivot hardware itself, may be directly molded into the window profile. Likewise, the pivot post for the window latch may be molded onto the inner face of the window sash. Significant labor savings is realized eliminating costs associated with mitering and other cutting, welding or screwing, and clean-up operations following the cutting and welding steps. The processing characteristics for an injection molded material are somewhat less stringent than those for extrusion. Accordingly, the material may be chosen for its strength, appearance and wearability rather than being limited by its extrudability. The material of choice is a filled polypropylene (fillers include glass, talc, and calcium carbonate). A volume of this molten thermoplastic polymer generally equal to about 75% of the volume of the mold is injected into the mold through a gate provided therefor. High pressure fluid (nitrogen or water) is injected through a pin orifice at pressures in the range of between 300 and 2000 psi to push the volume of molten plastic outwardly into contact with the walls of the mold and into all the recesses therein. While plastic is a more effective insulator than some materials used for extruded windows (aluminum, for example), an insulative cavity will be formed at the core of the mold by the pressurized fluid. This encapsulated air pocket enhances the insulative characteristics of the window and, in addition, reduces the amount of plastic it takes to construct the window component, thereby reducing material costs.

A first window, a casement window, resulting from this product-by-process, has a number of unique features. The casement window includes a one-piece window frame including a first hollow body housing an insulative air pocket; a first integrally molded pocket on each side of the window frame for receiving support hinge hardware; a one-piece window sash including a second hollow body housing an insulative air pocket, a second integrally molded pocket on each side of the sash operating with the first integrally molded pockets on said window frame to house the support hinge hardware; the support hinge hardware attached to both the window frame and the window sash in the first and second integrally molded pockets, respectively.

The casement window of the present invention preferably additionally includes flexible installation flanges which are trimmed to a size slightly larger than a window opening to receive the casement window and are folded back in the opening during installation. A recess on an external periphery of said window frame is provided for receiving a lip seal and lip seal retainer. The window frame includes a first integrally molded pivot hinge member that mates with a second integrally molded pivot hinge member on the sash to permit pivoting movement of the window sash in the window frame.

The casement window sash has a glazing bead recess integrally molded in an external periphery of said window sash. A latch mounted on the integrally molded pivot post, includes a latch handle and a latching arm which engages a latch retainer on the window frame to secure the window sash in a closed position. A screen securement groove is formed in an outwardly protruding surface of the seal retainer.

A second window design made according to the product-by-process of the present invention is a picture window frame that includes a first outer frame portion comprising a first one-piece, injection molded element with a window pane receiving pocket and having a hollow insulative core; a second inner frame portion comprising a second one-piece, injection molded element with a window pane receiving pocket and having a hollow insulative core; means to secure the second inner frame member to the first outer frame member sandwiching the window pane and retaining the window pane there between.

Another feature of the present invention comprises a window pane fashioned to resemble glass block. A first molded rectangular acrylic panel is formed into a first plurality of apparently separate portions with intervening mortar-like seams, each individual apparently separate portion being slightly outwardly convex and having a light-diffusing rippling therein. A second molded rectangular acrylic panel is formed into a second plurality of apparently separate portions with intervening mortar-like seams, each individual apparently separate portion being slightly outwardly convex. Means to secure said first and second panels is provided such that the slightly outwardly convex portions extend outwardly and the mortar-like seams extend inwardly into a juxtaposed position.

Various other features, advantages and characteristics will become apparent after a reading of the following specification.

BRIEF DESCRIPTION OF THE DRAWINGS

The preferred embodiment(s) of the present invention are set forth in the drawings, like items bearing like reference numerals and in which.

DETAILED DESCRIPTION OF THE PREFERRED EMBODIMENT(S)

Figure 1:
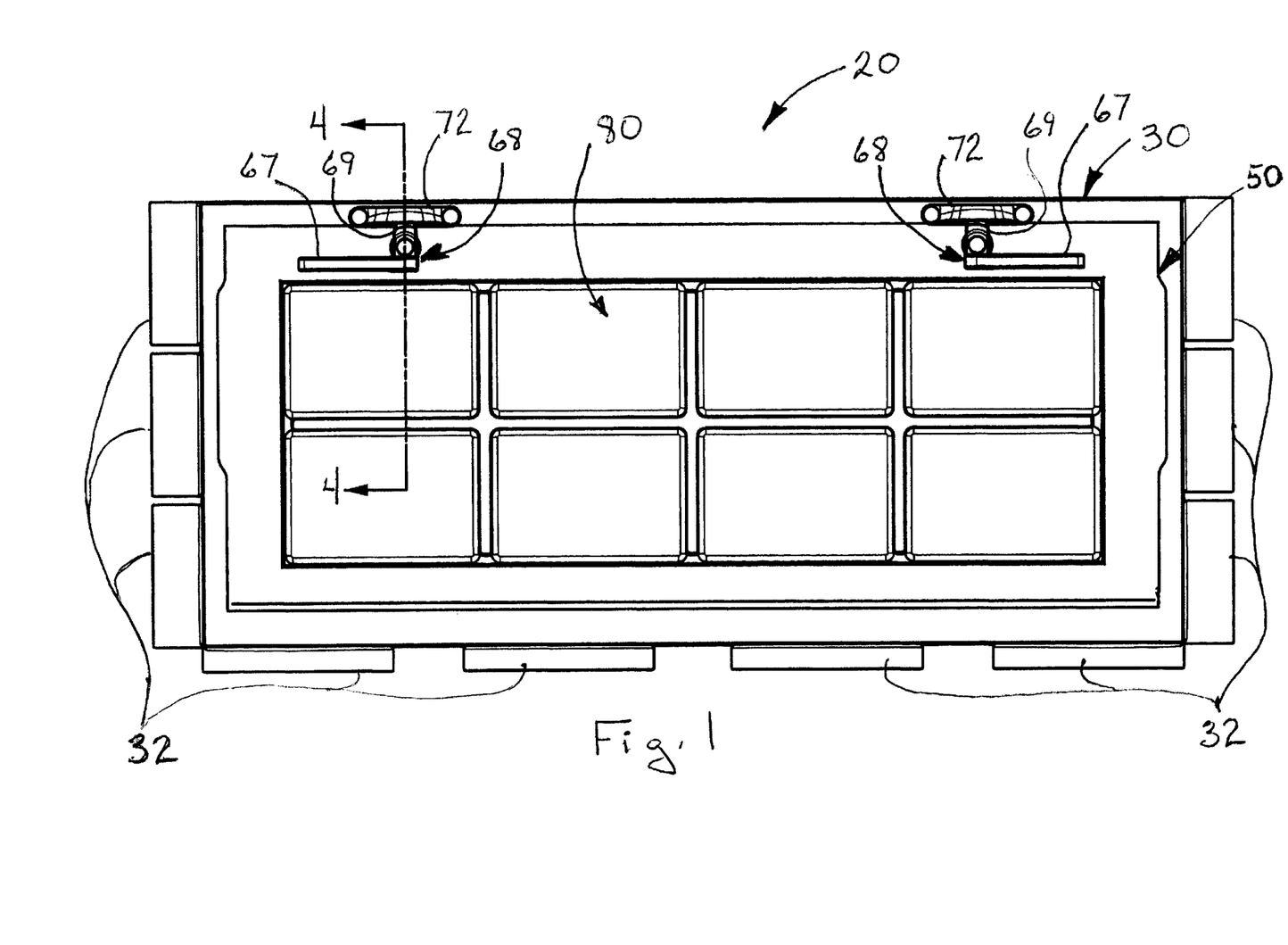
FIG. 1 is a front (inside) view of a first embodiment of a window, a casement window, of the product-by-process of the present invention.
Figure 2:
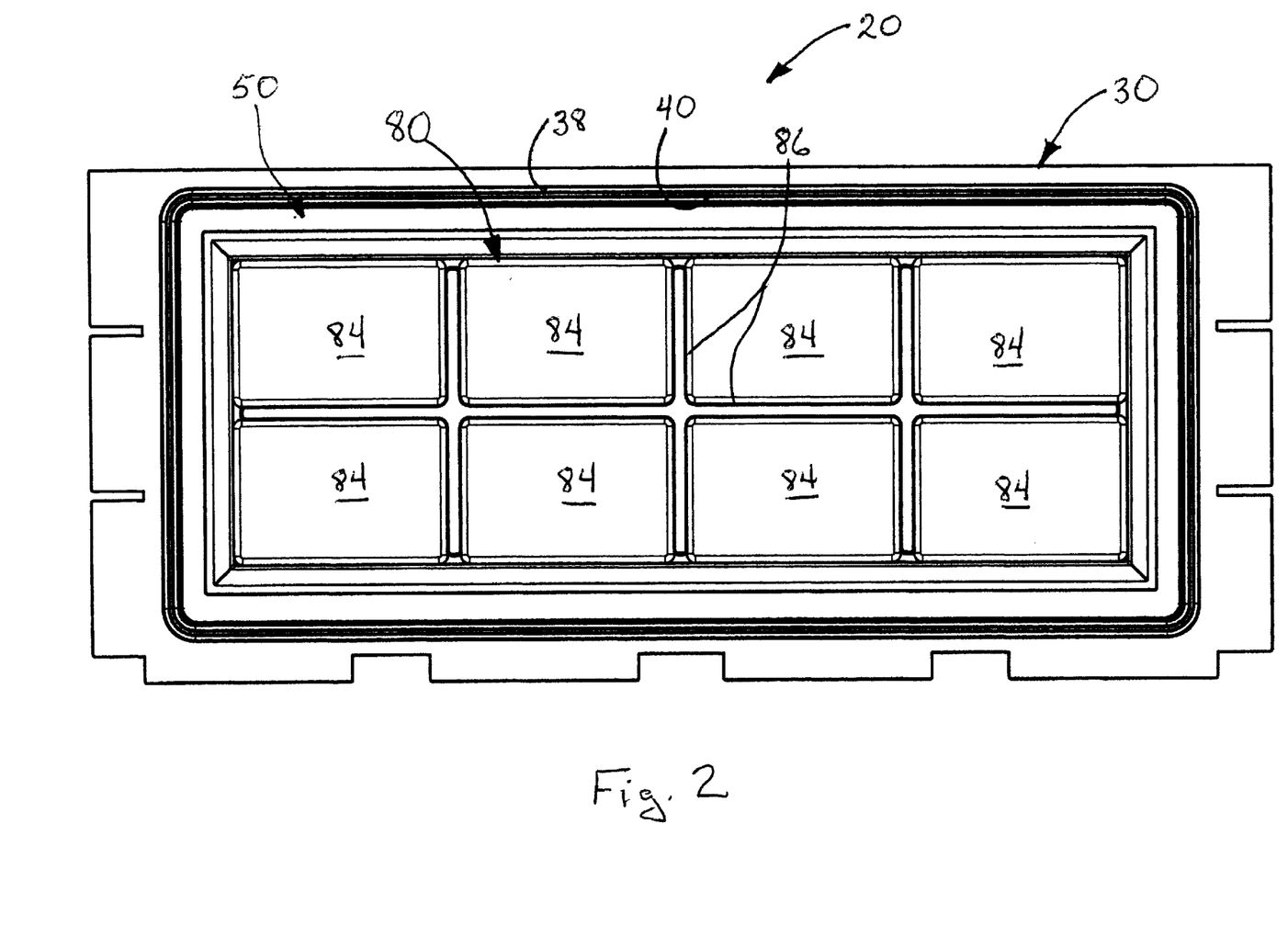
FIG. 2 is back (outside) view of the first embodiment of a casement window of FIG. 1.
Figure 3:
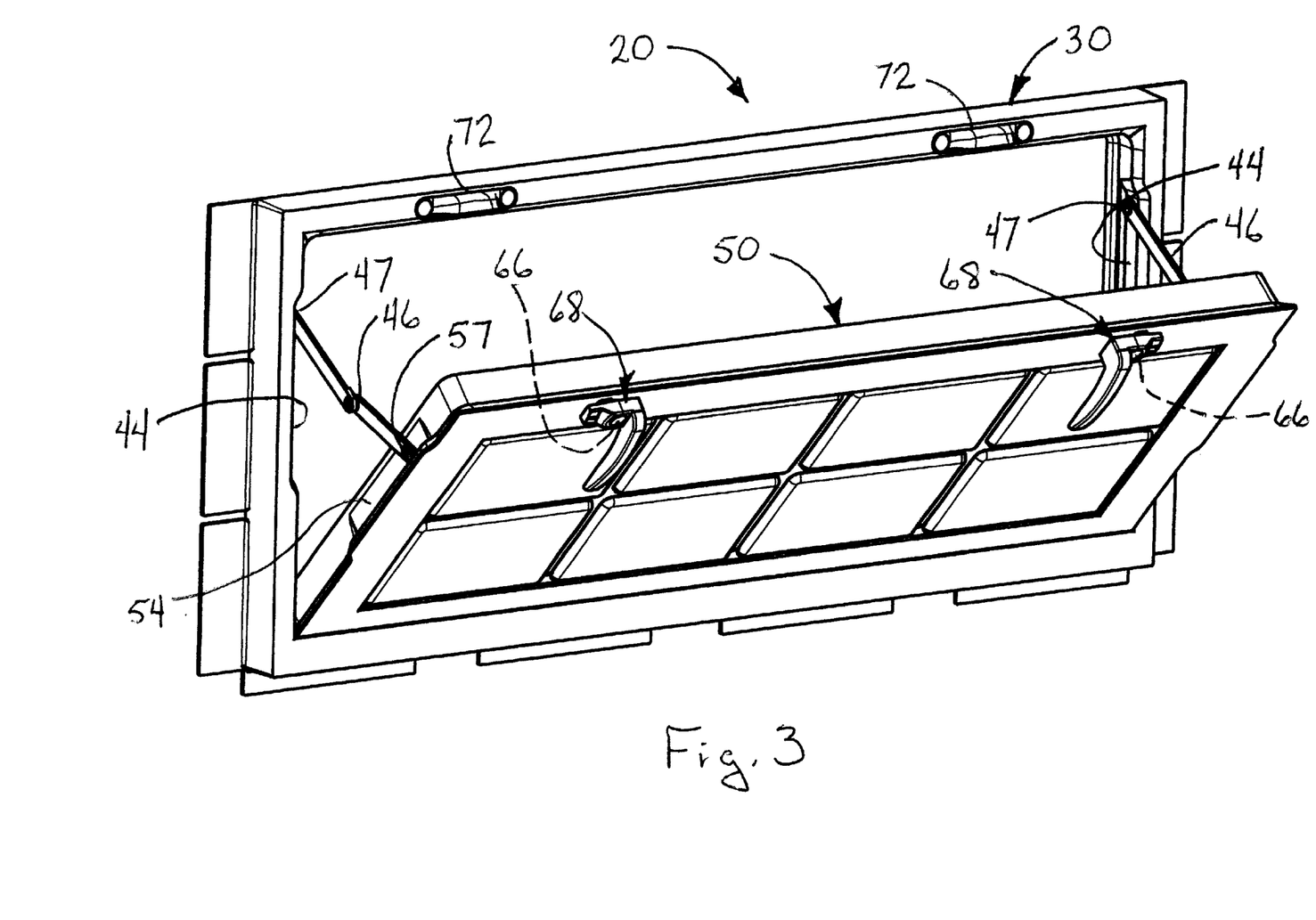
FIG. 3 is front perspective view of the casement window shown in the open position.

A first embodiment of the product-by-process, a casement (or hopper) window, is depicted in FIGS. 1, 2 and 3 generally at 20. Window 20 includes two interconnected one-piece window components: a one-piece injection molded window frame 30 and a one-piece injection molded sash 50.

Window frame 30 is a one-piece element made by injection molding, the process steps utilized in manufacturing to be discussed herein below. Window frame 30 has a plurality of outwardly extending flanges 32 which are scored to permit trimming to fit various width/height openings. A small amount of the extra length on the flanges 32 is allowed to remain and then folded into the opening to hold the window snugly in the opening while the window is secured in place by nails or screws.

Figure 4:
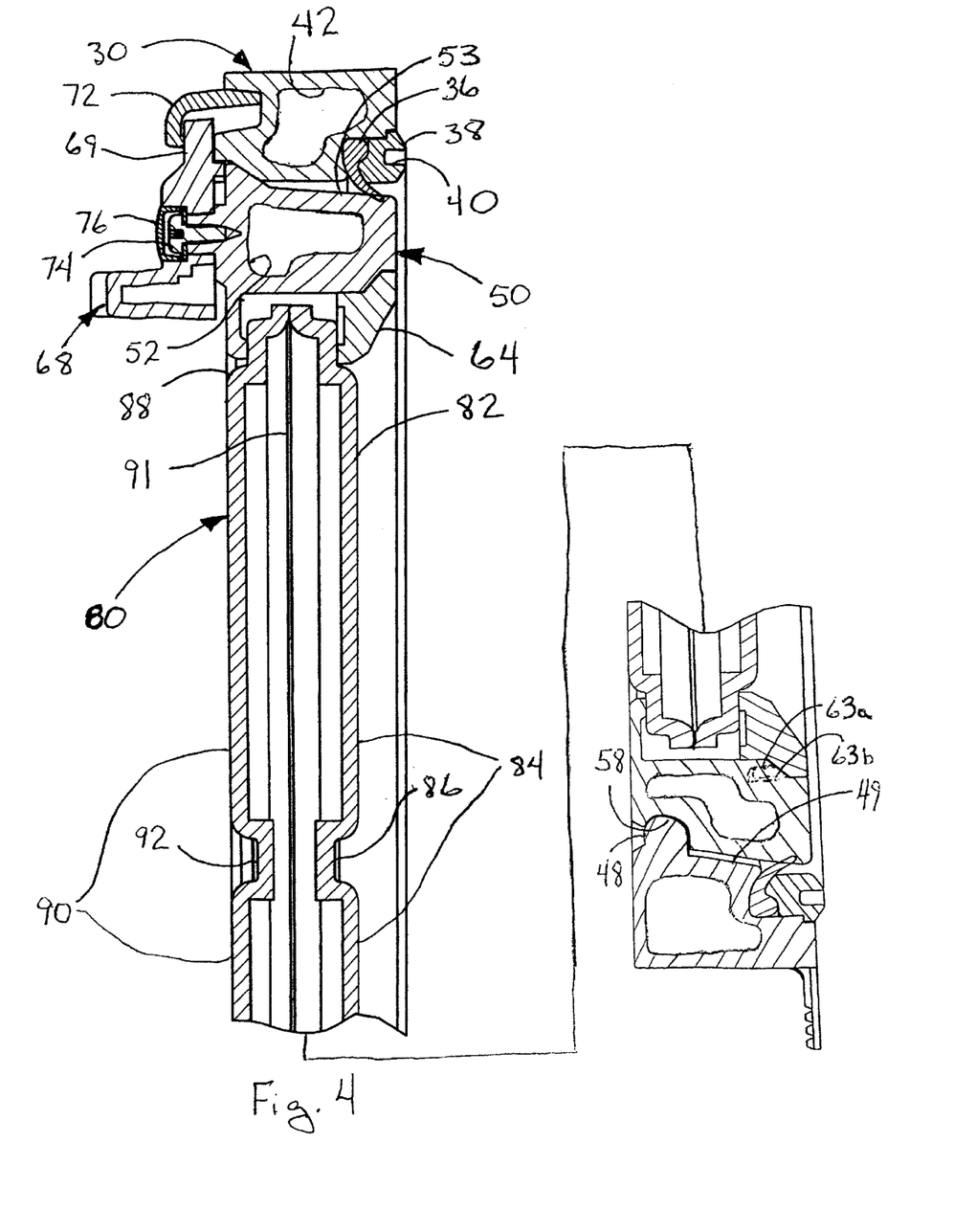
FIG. 4 is a cross-sectional side view as seen along lines 4—4 in FIG. 1.

As best seen in FIGS. 2 and 4, window frame 30 has a recess 34 on the outside 33 of the window frame 32 that receives a lip seal 36 and a lip seal retainer 38. Lip seal 36 engages the outer face 53 of the window sash 50 adjacent the periphery 51. Lip seal retainer 38 is formed with a recess 40 on its protruding side into which a screen and screen retainer (not shown) may be inserted. Window frame 30 is a hollow body which encapsulates an insulative air pocket 42 which, additionally, reduces the amount of polymer in the window frame 30, cutting costs and weight. A first pocket 44 is integrally molded into each side 45 of window frame 30 to provide clearance for support hinges 46. A first pivot hinge member 48 is integrally molded on the lower, inner edge 49 of window frame 30.

Window sash 50 is a second one-piece hollow body that encapsulates an insulative air pocket 52. A second pocket 54 is integrally molded into each side 55 of window sash 50 which correspond to first pockets 44 in window frame 30, cooperating therewith to provide clearance for support hinges 46 (FIG. 3). Support hinge hardware 46 is pivotally attached at 47 in pocket 44 and at 57 in pocket 54. A second pivot hinge member 58 is integrally molded on the lower, outer edge 59 of window sash 50. First pivot hinge member 48 and second pivot hinge member 58 on window frame 30 and window sash 50, respectively, mate to permit pivotal movement of the window sash 50 in frame 30. A glazing bead 64 has a plurality of posts 63a that plug into recess means 63b in an exterior portion of the window sash 50 to retain window pane 80 in the window sash 50.

Figure 5:
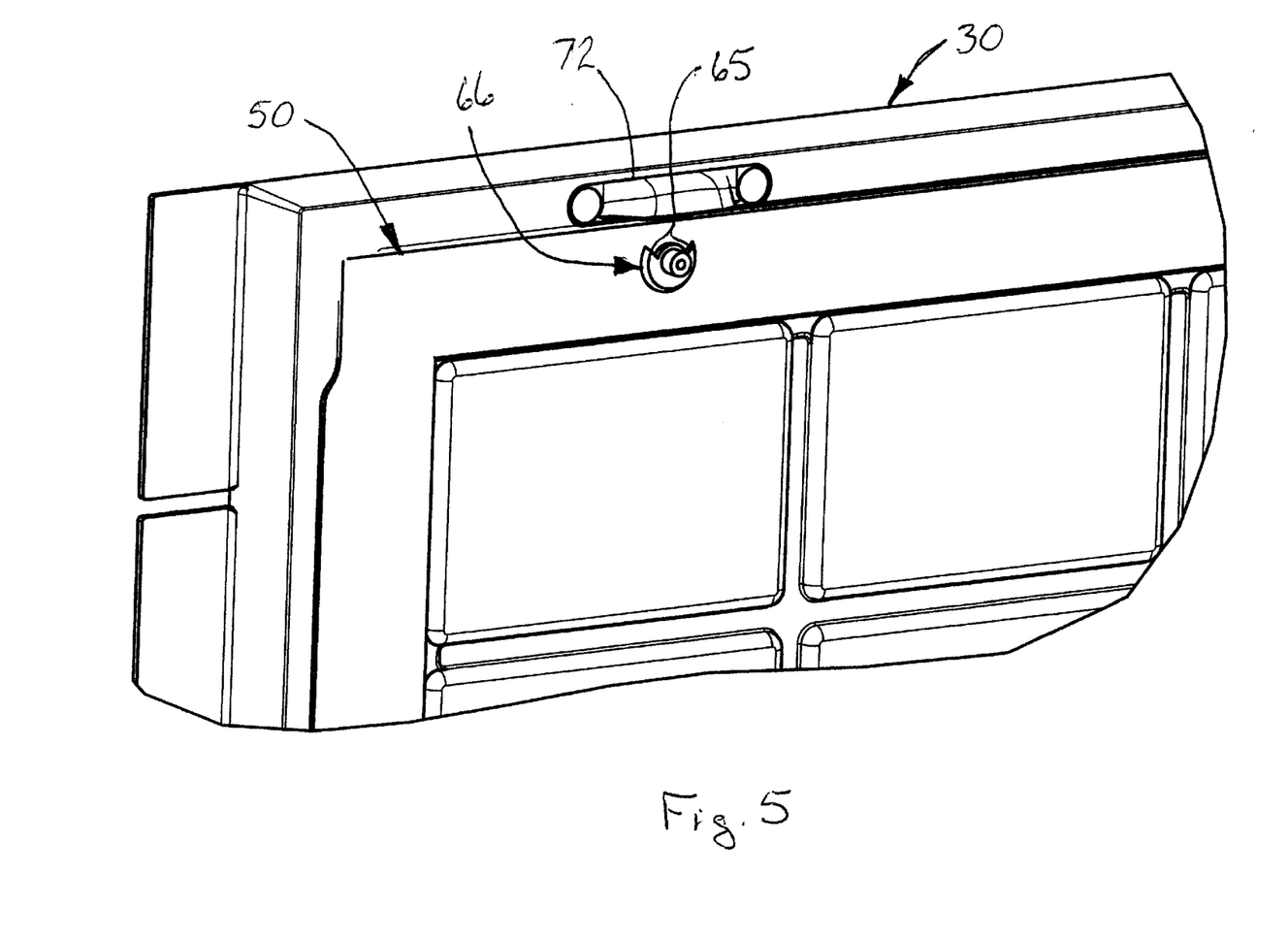
FIG. 5 is an enlarged detail of the pivot hinge member of the window sash.
Figure 6:
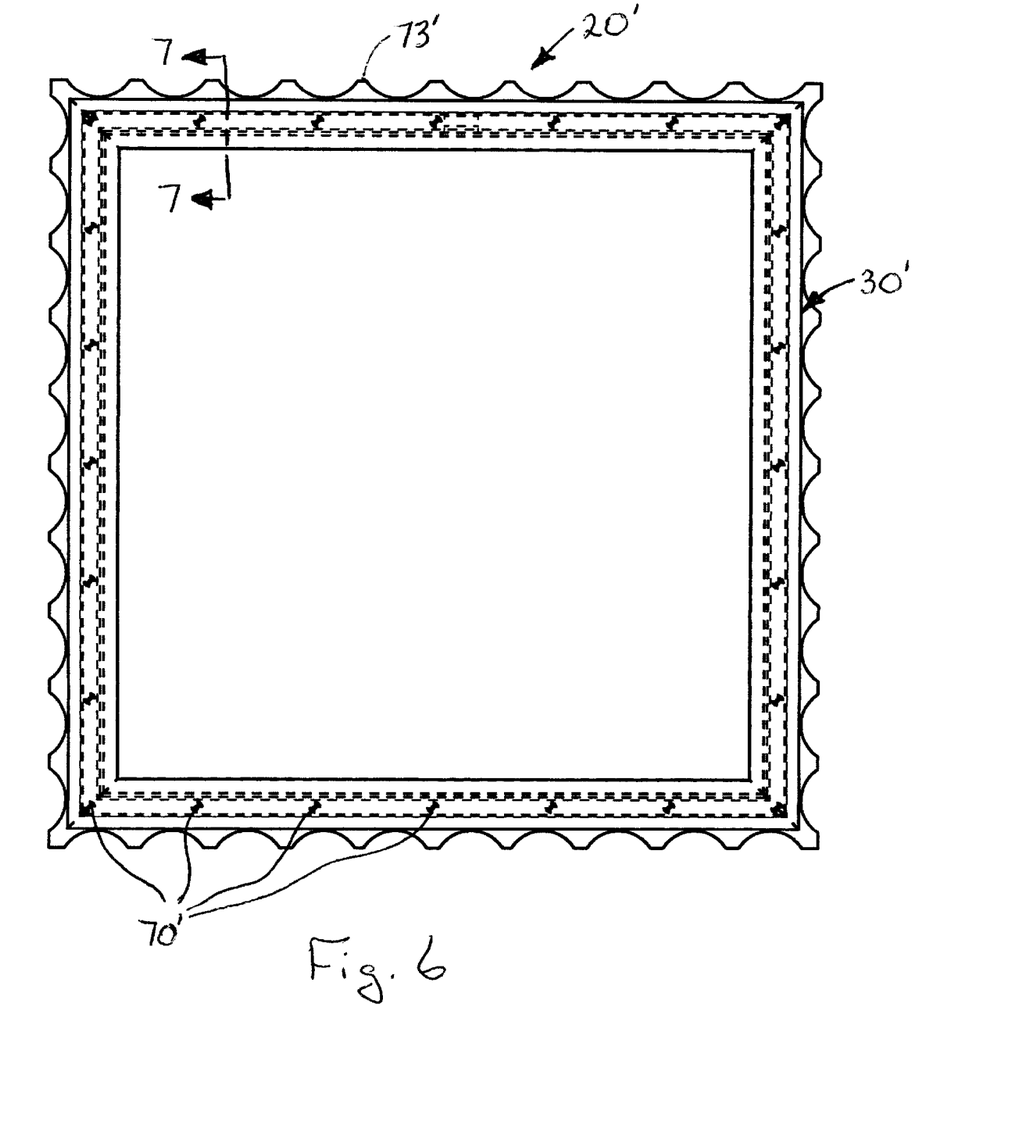
FIG. 6 is a front view of a second embodiment—a picture window—of the product by process of the present invention.

Two latch pivot posts 66 are integrally molded on the inner face of the window sash to receive latch 68. As best seen in FIG. 5, latch pivot posts 66 have a pair of surfaces 65 which engage complementary surfaces (not shown) on the rear of latch 68 restricting rotation of latch 68 to the 90° movement between open (FIG. 3) and closed (FIG. 1) positions. Screw 74 is inserted through latch 68 and engages in pivot post 66 (FIG. 4). A plastic screw cover 76 snaps over the head of screw 76. Each latch 68 includes latch handle 67 and latch arm 69 which engages in latch retainer 72 that is secured to window frame 30 to latch the window sash 50 in a closed position.

Figure 7:
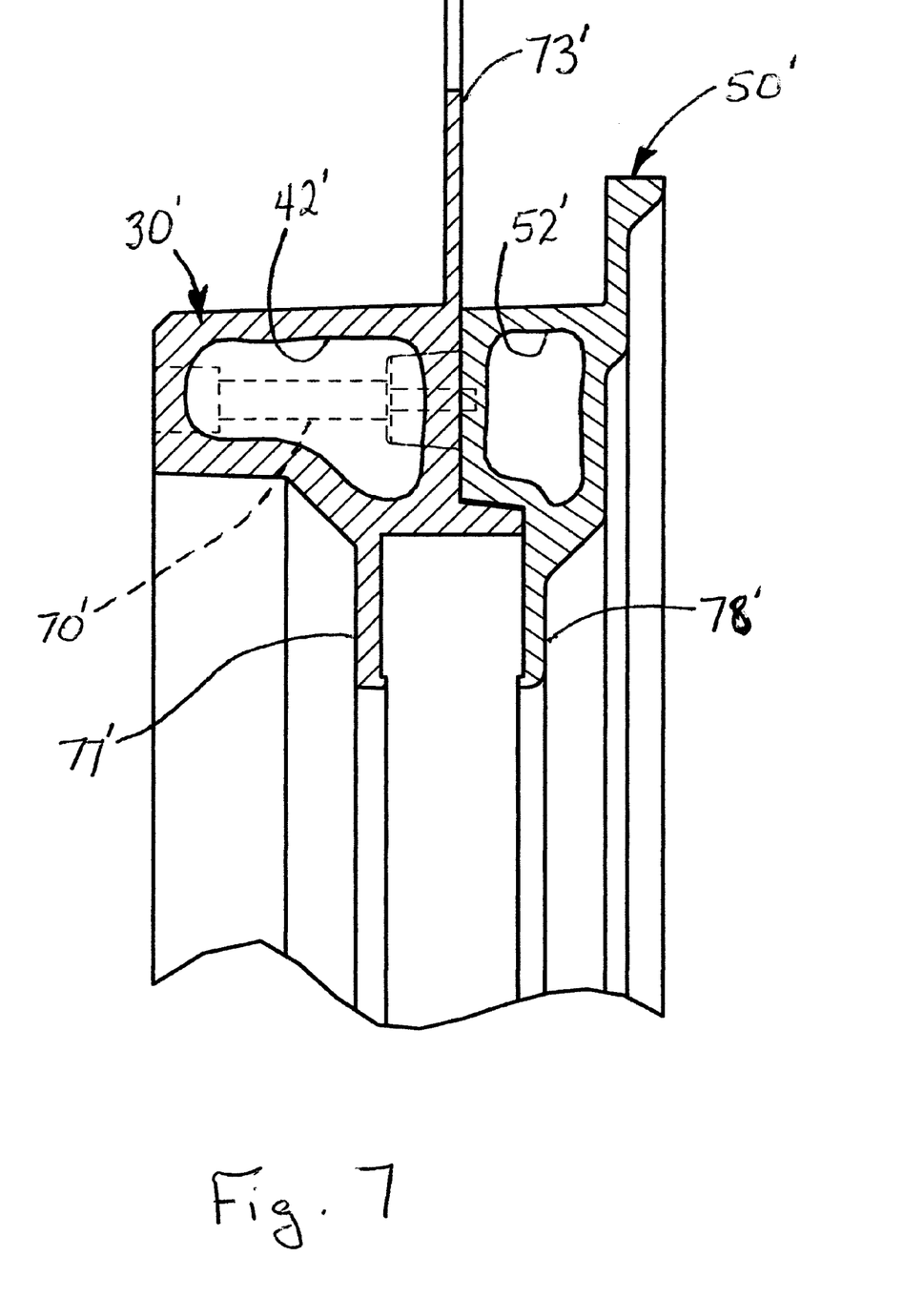
FIG. 7 is a cross-sectional side view of the second embodiment of the present invention as seen along line 7—7 in FIG. 6.
Figure 8:
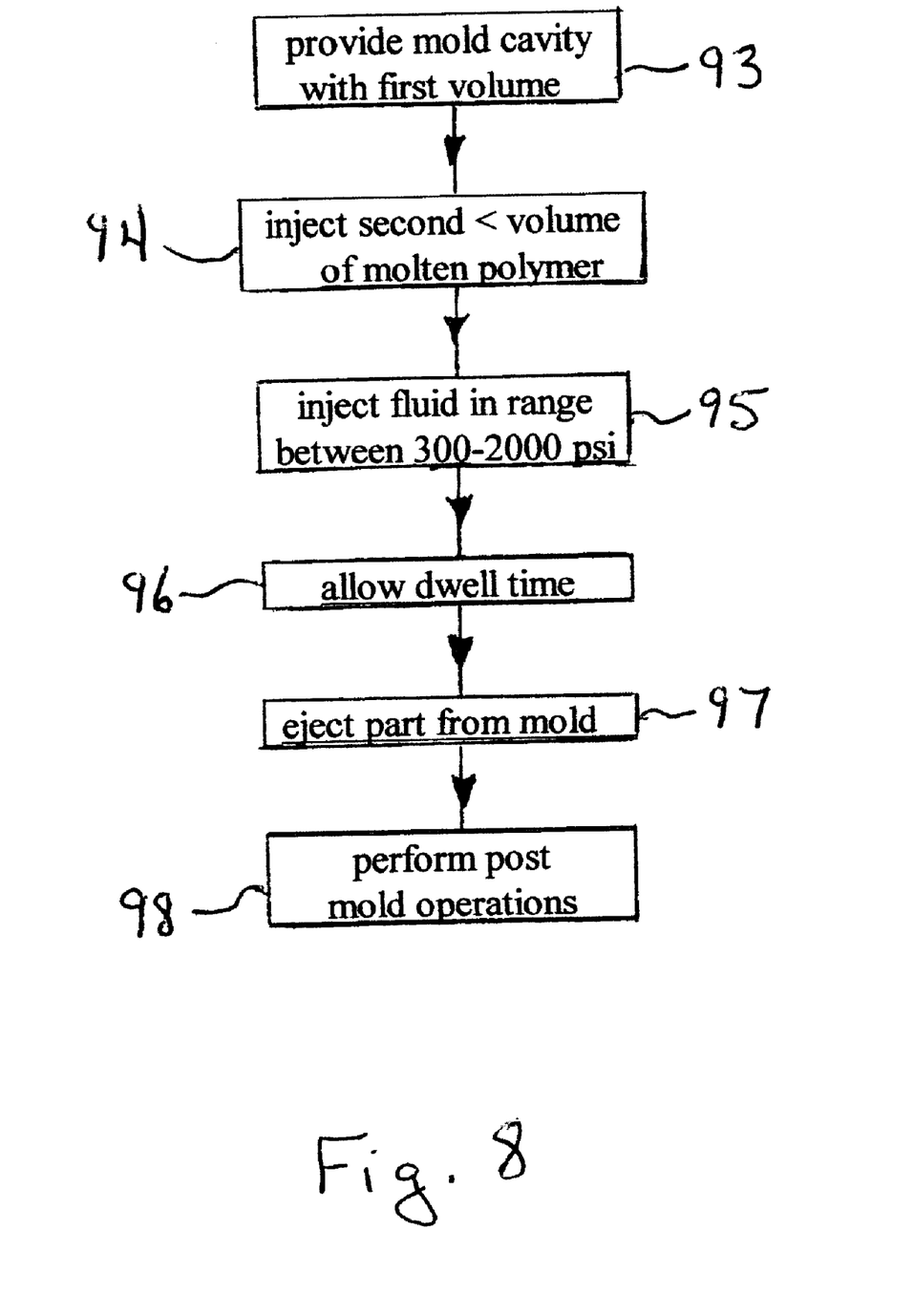
FIG. 8 is a flow chart of the process utilized in making the one-piece window components of the present invention.

A second embodiment of a product-by-process window of the present invention is shown in FIGS. 7 and 8, a picture window shown generally at 20'. A first window frame component 30' encapsulates a first insulative air pocket 42' and second window frame component 50' encapsulates a second insulative air pocket 52'. Components 30' and 50' have window pane engaging flanges 77' and 78' respectively which capture the window pane (not shown). A plurality of bolt receiving recesses 70' are molded into components 30' and 50'. A scalloped flange 73' may adorn the outer periphery of window frame 20'. Of course, such features as scalloped flange 73' and integrally molded recesses 70' are quite impossible with state-of-the-art extrusion technology.

Window pane 80 has been fashioned to mimic glass block appearance. Window pane 80 is made up of a first molded rectangular acrylic panel 82 which is subdivided into a first plurality of apparently separate portions 84 with intervening mortar-like seams 86. The portions 84 which are made to appear separate are slightly outwardly convex and have a light-diffusing rippling which enhances the glass block appearance. A second molded rectangular acrylic panel 88 is subdivided into a second plurality of apparently separate portions 90 with intervening mortar-like seams 92. Similarly, portions 90 are slightly outwardly convex. Second panel 88 may, or may not, include the light-diffusing rippling, depending on the desired amount of light transmitted and overall visual appearance desired. Panels 82 and 88 are adhesively welded together along lateral edge 91 with the slightly outwardly convex portions 84 and 90 protruding in opposite directions while mortar-like seams 86 and 92 are held in juxtaposed positions (FIG. 4).

The steps employed in the product-by-process of the present invention are flow charted in FIG. 8. The first step 93 in the product-by-process is the provision of a mold cavity with a first volume. The mold cavity will have all the features desired in the resulting product including blended three-dimensional geometries that produce clearance pockets for support hinge hardware and integral pivot hinges. The next step 94 is the injection of a second volume of molten polymer that is less than the first volume. Typically, the second volume is generally about 75% of the first volume. The polymer of choice for the casement window 20 made by this process is a filled polypropylene, fillers including glass, talc and calcium carbonate. The molten polymer is injected through a gate in the mold provided for that purpose. Next, in step 95 high pressure fluid is injected into the mold through a hollow pin. The fluid, which may be nitrogen or water, for example, is injected at pressures ranging between 300 and 2000 psi. This gas-assist step ensures that the molten plastic fills all the recesses of the mold and results in a hollowing out of the window component. As earlier noted, this has the doubly beneficial effect of providing an encapsulated air pocket that has beneficial insulative effects and reduces the amount of material needed to produce the component, lessening product costs and weight.

Step 96 requires a certain dwell time in the mold which may vary from 30 to 90 seconds, depending on the particular cure time of the polymer. For the filled polypropylene used in this process, dwell times are around 60 seconds. In step 97, the part is ejected from the mold and in step 98, the part undergoes post-molding operations including trim, clean and assembly. It will be understood that these post-molding operations are significantly fewer, less time consuming and costly than the post-molding operations required for a corresponding extruded product.

The product-by-process window component of the present invention has significant advantages over the state-of-the-art extruded window which is currently available. A partial list of these advantages include enhanced structural integrity and strength. There are no joints in the resultant window component that will be loosened if the component is subjected to torque. There is a significant cost savings in labor required to finish the product. All mounting hardware, pivot hinges, clearance pockets and desired external features are molded directly into the product so they need not be subsequently added. Mounting flanges are incorporated into the molded part, flanges which have the capability to accommodate a plurality of sizes of window openings. The overall appearance of the window is aesthetically much more attractive. The amount of fasteners required is significantly reduced eliminating both labor required for installation and the amount of metal in the end product, such metallic fasteners being heat conductors that reduce the insulative capabilities of the window.

The invention includes a novel window pane made of bonded acrylic panels which mimic the glass block look at a fraction of the weight, cost of installation and have superior insulating characteristics. Novel features about the casement window resulting from the product-by-process include the integral clearance pockets on the window frame and sash for housing the support hinge hardware; integrally molded pivot hinge hardware on the window frame and sash; flexible installation flanges on the window frame that may be trimmed to fit a plurality of different sized openings.

Various changes, alternatives and modifications will become apparent to one of ordinary skill in the art following a reading of the foregoing specification. For example, it will be obvious that other product-by-process windows are within the scope of the invention. In addition, other more conventional window panes can be employed in the casement window 20 of the present invention. It is intended that all such changes, alternatives and modifications as fall within the scope of the appended claims be considered part of the present invention.

We claim:

1. A one-piece, integral molded window component selected from the group consisting of a window sash and a window frame made by the process including the steps of
   a) providing a mold cavity incorporating the desired window component construction, said mold cavity having a first volume;
   b) injecting a second volume of molten plastic which is less than said first volume;
   c) introducing a high pressure fluid into said mold cavity to hollow out said second volume of molten plastic and force amounts of said molten plastic into all peripheral regions of said mold cavity creating a structural element with a hollow insulative core;
   d) allowing adequate dwell time in the mold for said molten plastic to set;
   e) ejecting said molded window component from the mold;
   f) subjecting said molded window component to post-molding operations.

2. The one-piece, integral molded window component made by the process of claim 1 wherein said providing step includes providing a mold cavity with three dimensional blending of geometries of said window component.

3. The one-piece, integral molded window component made by the process of claim 1 wherein said injecting step includes providing a quantity of molten plastic generally equal to 75% of said first volume.

4. The one-piece, integral molded window component made by the process of claim 1 wherein said injecting step is further characterized by the molten plastic consisting of a thermoplastic polymer.

5. The one-piece, integral molded window component made by the process of claim 4 wherein said injecting step is further characterized by the thermoplastic polymer being a filled polypropylene.

6. The one-piece, integral molded window component made by the process of claim 1 wherein said introducing step is further characterized by said high pressure fluid being selected from the group consisting of nitrogen and water.

7. The one-piece, integral molded window component made by the process of claim 6 wherein said introducing step is further characterized by an injection pressure of said high pressure fluid falling in the range of between 300 and 2000 psi.

* * * * *